Oct. 26, 1971    G. D. FETTE    3,614,857
AUTOMATIC LIQUID EJECTION TRAP
Filed Dec. 29, 1969    2 Sheets-Sheet 1
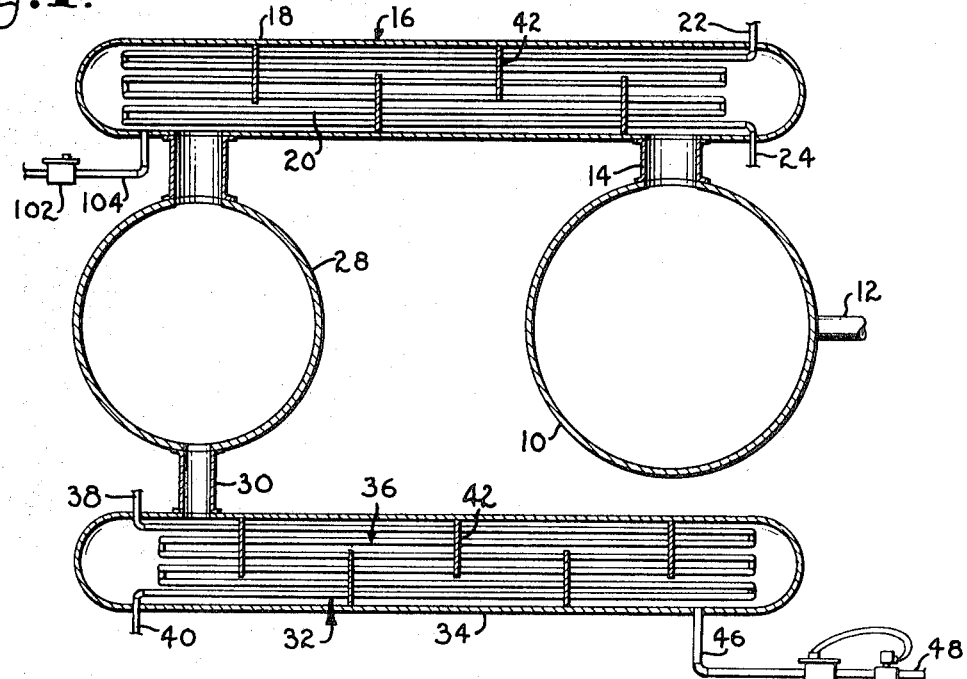
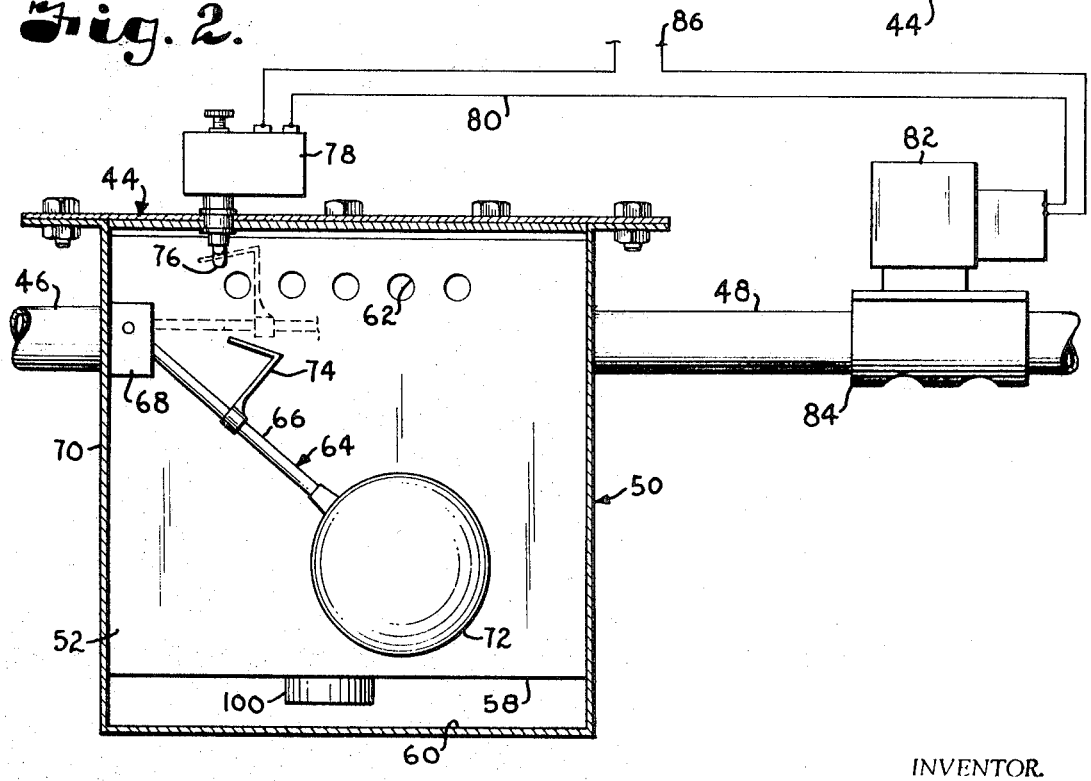
INVENTOR.
GEORGE D. FETTE
BY Don M. Bradley
ATTORNEY Oct. 26, 1971 G. D. FETTE 3,614,857
AUTOMATIC LIQUID EJECTION TRAP
Filed Dec. 29, 1969 2 Sheets-Sheet 2
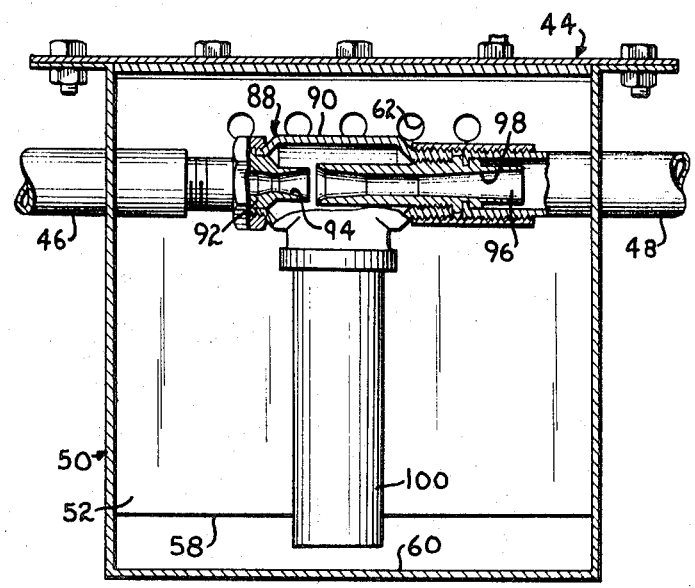
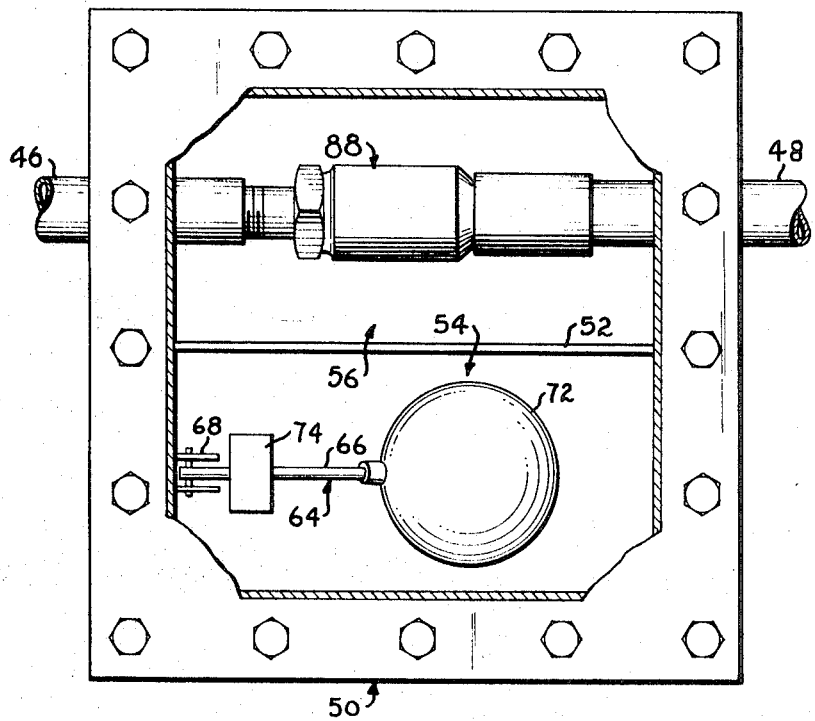
INVENTOR.
GEORGE D. FETTE
BY Don M. Bradley
ATTORNEY United States Patent Office 3,614,857
Patented Oct. 26, 1971

3,614,857
AUTOMATIC LIQUID EJECTION TRAP
George D. Fette, 3010 McGee St., Apt. 1,
Kansas City, Mo. 64108
Filed Dec. 29, 1969, Ser. No. 888,310
Int. Cl. B01d 45/02
U.S. Cl. 55—219
7 Claims

ABSTRACT OF THE DISCLOSURE

A trap comprising a closed vessel communicating through a conduit with a pressurized gas system. A pressurized gas flow suction device in the conduit permits gravitation of liquid and solid contaminants into the vessel and a float controlled solenoid valve on the discharge opens to create a flow of pressurized gas through the device when the contaminants reach a predetermined level in the vessel. This flow sucks the contaminants through the device for discharge in the gas stream to empty the vessel.

---

This invention relates to pressurized gas systems, and more particularly, to a trap for collecting and removing contaminants from such a system.

Water condensation, oils, greases and other contaminants are common in pressurized gas systems. They may present particularly acute problems in such systems as mechanical refrigeration systems or the like. For example, the contaminants in the gas can clog valves and otherwise disrupt or corrode the normal functioning of the components of the system.

For this reason it is conventional to provide traps disposed to collect and accumulate these contaminants at points in the system where such accumulation may occur by gravitation. These traps require periodic emptying when such accumulation has proceeded to a predetermined quantity.

It is possible that the traps may be drained at periodic intervals. Normally, however, it is not possible to accurately forecast accumulation to an extent that manual removal of the contaminants may be relied upon. It is more usual to employ automatic discharging apparatus which opens when a predetermined quantity of contaminants has collected in the trap vessel.

Traps presently in use have valved discharge openings for draining the contaminants from the vessel. The periodic opening of the discharge permits the solid content of the waste to accumulate and clog the outlet. This characteristic is aggravated as a result of the tendency of oils and greases to more or less solidify in the vessel when permitted to stand for relatively long intervals of time. Some or all of the solid content may not be evacuated each time the vessel discharges its contents. Frequent opening and cleaning of the vessels is often required.

Such cleaning operations are not only disagreeable and time consuming, but they also may cause "down time" from operation of the system itself. Also, since the discharge from the trap is intended to be automatic, over accumulation of contaminants may go undetected until the contaminants have damaged or destroyed the components of the system.

Accordingly, it is the primary object of this invention to provide an automatic discharging trap of this kind which is capable of positively removing both solid and liquid contents at each discharge operation.

Still another object of the invention is to provide such a trap which automatically utilizes the gas pressure of the system for positive ejection of the contaminant material.

In the achievement of the foregoing objects, it is yet another object of the invention to provide a trap which is relatively free from required cleaning and maintenance even though it does not discharge for relatively long periods of time.

It is also an object of the present invention to provide a trap wherein the contents are almost entirely emptied from the collecting vessel during each discharging phase of the operation.

A still further object of the invention is to provide a trap which can be economically fabricated from generally commercially available components, yet which is highly reliable and is ideally suited to entirely automatic operation.

These and other important aims and object of this invention will be more fully explained or will become apparent from the description, claims and the drawings.

In the drawings:

FIG. 1 is a fragmentary, partially schematic, vertical cross-sectional view, on a reduced scale, through the compressor and cooler components of a pressurized gas system of a kind in which the apparatus of this invention may be advantageously employed;

FIG. 2 is a fragmentary, vertical cross-sectional view through a trap embodying the principles of this invention, an alternate position of the float structure being shown fragmentarily in broken lines;

FIG. 3 is a view similar to FIG. 2 but taken on a different plane to reveal the ejector device, parts being broken away and appearing in cross-section to reveal details of construction; and FIG. 4 is a top plan view of the trap vessel, parts being broken away to reveal details of construction.

A system in which apparatus embodying the principles of this invention may be advantageously used is illustrated in FIG. 1 and may comprise a portion of an air compressing system. The gas to be pressurized, in this case air, enters a low pressure compression cylinder 10 via an inlet pipe 12. Action by the piston (not shown) of cylinder 10 partially compresses the air which exits the cylinder via an outlet 14.

The partially compressed air enters an inter-cooler 16 comprising a tank 18 and a cooling coil unit 20. A coolant such as cool water or the like enters coils 20 by an inlet 22. After the water circulates through coils 20, it leaves the inter-cooler via an outlet pipe 24.

The partially compressed and cool air from tank 18 then passes through a connector and into a high pressure compressing cylinder 28. The pressurized air then leaves via outlet 30 where it is further cooled in an after-cooler 32.

After-cooler 32 may be constructed similar to inter-cooler 16 and includes a tank 34 and a series of cooling coils 36. Manifestly, water for coils 36 may enter the after-cooler by an inlet pipe 38. The water is subsequently discharged through an outlet pipe 40.

Both coolers 16 and 32 preferably have a plurality of baffles 42 constructed therein and disposed to insure that the air flow over the cooling coils permits the transfer of heat from the air to the coolant.

Although the system of FIG. 1 has been described as an air compressor system, it will be readily understood by those having skill in this art that a similar system could be utilized for compressing any other gas. It is also contemplated that the cylinders 10 and 28 would, for most operations, be provided with cooling jackets or the like. Since such structures are well known in this art, it is believed that the showing and description to this point are sufficient.

The cooling of the compressed gas tends to cause condensation of any water content in the gas. When relatively humid air is the gas which is compressed by the system, such condensation can be substantial. The compressor cylinders are lubricated with oils and greases. When the system is used in connection with food processes, the compressor pistons are conventionally fitted with carbon rings. All of these systems may provide liquid and solid contaminants in the system. For this reason, it is conventional to provide traps in the system for removing these contaminants.

A trap broadly designated by the reference numeral 44 embodying the principles of this invention is shown connected to tank 34 by a conduit 46. A discharge pipe 48 emanates from the trap. The trap 44 is disposed at a position below tank 34 to permit the liquid and solid contaminants to gravitate to the trap through pipe 46.

Referring now particularly to FIGS. 2, 3 and 4, trap 44 comprises a closed vessel 50. The walls of vessel 50 are constructed to withstand the pressures of the pressurized gases in tank 34 since the interior of vessel 50 communicates directly with tank 34 through pipe 46 and is at the same gas pressure.

A transversely extending baffle wall 52 divides the vessel 50 into a pair of compartments 54 and 56 as shown in FIG. 4. The lowermost edge 58 of baffle 52 terminates in vertically spaced relationship above the bottom 60 of vessel 50 to permit fluid communication between the compartments. Further, a series of holes 62 near the upper margin of baffle 52 permits the equalization of pressures between the compartments even when a quantity of liquid is present in the vessel.

Float structure 64 in compartment 54 comprises on elongated rod 66 pivotally coupled at one end to a bracket 68 mounted on a side wall 70 of vessel 50. A float 72 which map comprise a hollow sphere is affixed to the outermost end of rod 66 for rising with the level of liquid in vessel 50. An actuator 74 carried by rod 66 intermediate its ends is adapted to engage an operating means comprising the plunger 76 of a normally open electrical switch 78 and switch 78 which is interposed in an electrical circuit 80 which is, in turn, operatively coupled with a solenoid 82 forming a part of a solenoid valve 84. The latter is interposed in the discharge pipe 48 emanating from trap 44. Manifestly, circuitry 80 is adapted to be coupled a source of electrical energy illustrated schematically in FIG. 2 and designated by the reference numeral 86.

Conduit or pipe 46 enters vessel 50 through the side wall thereof and is coupled with a pressurized gas flow suction ejector device broadly designated by the numeral 88. Device 88 is disposed in compartment 56. The device may be of any suitable commercially available types such as a Penberthy series 20A ejector manufactured and sold by Penberthy Manufacturing Company, Prophetstown, Ill. The device 88 illustrated in the drawings includes a body 90, an inlet jet 92 having an axial bore 94 of varying cross sectional diameter and a delivery jet 96 also provided with a bore 98 of varying cross sectional diameter as shown in FIG. 3. A suction tube 100 extends downwardly from body 90 into relatively close proximity to the bottom 60 of vessel 50. It should be noted that delivery jet 96 is coupled with the discharge pipe 48.

In operation, the liquid and solid contaminants gravitate through pipe 46, bore 94, tube 100 and enter vessel 50. As the level of liquid in the vessel rises, float 72 swings rod 66 generally to the position shown in broken lines in FIG. 2. This brings actuator 74 into engagement with plunger 76 of switch 78. When plunger 76 is moved sufficiently to close switch 78, solenoid 82 is energized thereupon opening valve 84 to permit the flow of pressurized air or gas through pipe 48.

The gas flowing through pipe 46 enters body 90 through bore 94 and they are energized for discharge with the gas upper end of tube 100 and draws the contaminants from vessel 50 through tube 100. The contaminants are entrained in the stream of pressurized gas entering through bore 94 and they are energized for discharge wtih the gas out of the vessel through pipe 48.

The relatively high pressures which are normally involved presents a high velocity and therefore high energy stream when the gas is discharged to atmosphere. The suction which draws the contaminants is therefore relatively great and solid constituents of the contaminants are drawn in the high velocity stream with the liquid portion of the contaminants. This insures a good cleaning action each time the apparatus goes through its discharging cycle and prevents the accumulation and settling of solids which might otherwise clog the apparatus.

Solenoid 82 may be provided with a delay mechanism or the like to insure that sufficient pressurized gas is drawn through the apparatus at each discharge cycle to insure a substantially complete emptying of the contents of vessel 50 during each cycle. Alternatively, a second switch (not shown) might be provided in conjunction with the float structure to effect closing of the valve 84 only after the float returns to a predetermined initial position.

It will be understood that traps for collecting the contaminants in substances of this general type are conventionally provided in conjunction with each inter or after-cooler, air receivers and the like. Accordingly, in FIG. 1 a second trap 102 which might be constructed identical to trap 44 is shown communicating through a pipe 104 with tank 18.

Those skilled in this art will readily recognize that traps embodying the principles of this invention may have a wide variety of uses and that the specific construction illustrated in the drawing merely exemplifies one embodiment useful in a compressed air system or the like. The trap might also be used to remove condensation from steam lines. The higher pressures and temperatures often encountered in steam systems may dictate heavier construction and use of other materials than that suitable for use with air lines. For example, it may be necessary to construct the float 72 and valve 84 of stainless steel when the structure is to be used with high pressure steam while bronze or brass construction will usually be satisfactory for compressed air installations or installations where low pressure steam in the order of about 60 p.s.i. or less is to be encountered. Obviously, some suitable flush tank or receiver which meets the applicable building code requirements would be provided for the discharge from line 48 in such steam condensate removal installations.

Having thus described the invention, what is claimed as new and desired to be secured by Letters Patent is:

1. Apparatus for removing liquid and solid contaminants from a pressurized gas system, said apparatus comprising:
   a closed contaminant collecting vessel;
   conduit means communicating with the vessel operatively associated and arranged with said vessel and said system for fluidly communicating said system with said vessel for gravitation of the contaminants from said system into said vessel;
   a pressurized gas flow suction ejector device having an inlet in communication with the pressurized gas, a suction tube in communication with the interior of the vessel, and a discharge exteriorly of the vessel, said conduit means being said inlet;
   normally closed valve means operably constructed and arranged within said discharge; and
   responsive means responsive to the quantity of contaminants in the vessel and operably coupled with said valve means for opening the latter upon a predetermined accumulation of contaminants in said vessel, whereby flow of pressurized gas through the device draws the contaminants through the suction tube for ejection with the gas out the discharge.

2. The invention of claim 1, wherein said responsive means includes float structure in the vessel and movable with the level of liquid, and operating means coupled with the valve means disposed to be engaged by the float structure when the latter is in a predetermined position thereof for opening said valve means.

3. The invention of claim 2, wherein said operating means includes a solenoid connected to said valve means, and electrical circuitry operatively coupled with the solenoid, said circuitry including an electrical switch provided with an operating arm disposed in the path of movement of said float structure.

4. The invention of claim 3, wherein said float structure includes an elongated rod pivotally coupled at one end thereof to the sidewall of said vessel, a float carried by the rod remote from said one end, and actuator means carried on the rod intermediate the float and said one end in disposition to engage said switch operating arm when the rod reaches a predetermined position in the vessel.

5. The invention of claim 1, wherein said ejector device is disposed in the vessel, said inlet being in communication with the pressurized gas whereby the contaminants gravitate into the vessel through the inlet and suction tube when said valve means is closed.

6. The invention of claim 5, wherein the lowermost end of the suction tube extends into relatively close proximity to the bottom of the vessel whereby said vessel is substantially emptied of contaminants when the valve means is opened.

7. The invention of claim 6, wherein said responsive means includes float structure in the vessel, and baffle means in the vessel extending between the float structure and the ejecting device, said baffle means having an opening therethrough to permit the flow of said contaminants through the baffle means.

References Cited

UNITED STATES PATENTS

| | | | |
|---|---|---|---|
| 1,353,457 | 9/1920 | Crosthwait | 137—204 X |
| 1,940,734 | 12/1933 | Shipman | 62—471 X |
| 2,332,982 | 10/1943 | Blair | 417—185 X |
| 3,318,323 | 5/1967 | Pearson. | |

FOREIGN PATENTS

| | | | |
|---|---|---|---|
| 141,773 | 5/1935 | Germany | 137—194 |

DENNIS E. TALBERT, JR., Primary Examiner

V. H. GIFFORD, Assistant Examiner

U.S. Cl. X.R.

55—269, 431; 62—475; 137—397; 222—62

UNITED STATES PATENT OFFICE
CERTIFICATE OF CORRECTION

Patent No. 3,614,857          Dated October 26, 1971

Inventor(s) George D. Fette

It is certified that error appears in the above-identified patent and that said Letters Patent are hereby corrected as shown below:

Column 3, line 69, after the numeral 94 delete "and they are energized for discharge with the gas" and insert therefor -- . This flow diminishes the fluid pressure in the --.

Signed and sealed this 28th day of March 1972.

(SEAL)
Attest:

EDWARD M. FLETCHER, JR.          ROBERT GOTTSCHALK
Attesting Officer                Commissioner of Patents